(12) United States Patent  
Bocking

(10) Patent No.: US 8,255,835 B2  
(45) Date of Patent: Aug. 28, 2012

(54) METHOD AND SYSTEM FOR MANAGING UNREAD ELECTRONIC MESSAGES

(75) Inventor: Andrew D. Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1069 days.

(21) Appl. No.: 10/785,340

(22) Filed: Feb. 24, 2004

(65) Prior Publication Data

US 2005/0188320 A1   Aug. 25, 2005

(51) Int. Cl.  
*G06F 3/048* (2006.01)

(52) U.S. Cl. ........ 715/859; 715/739; 715/752; 715/753; 715/765; 715/837; 715/854; 715/855

(58) Field of Classification Search .................. 715/752, 715/859, 753, 739, 765, 837, 854, 855; 709/205, 709/206

See application file for complete search history.

(56) References Cited

U.S. PATENT DOCUMENTS

| | | | | |
|---|---|---|---|---|
| 5,003,577 A | * | 3/1991 | Ertz et al. ................... 379/88.13 |
| 5,426,424 A | * | 6/1995 | Vanden Heuvel et al. ... 340/7.52 |
| 5,504,897 A | * | 4/1996 | Gans et al. ............................. 1/1 |
| 5,539,530 A | * | 7/1996 | Reifman et al. .............. 358/402 |
| 5,579,472 A | * | 11/1996 | Keyworth et al. ............ 715/751 |
| 5,617,539 A | * | 4/1997 | Ludwig et al. ................ 709/205 |
| 5,687,216 A | * | 11/1997 | Svensson ................... 455/412.2 |
| 5,758,079 A | * | 5/1998 | Ludwig et al. ................ 709/204 |
| 5,764,901 A | * | 6/1998 | Skarbo et al. ................. 709/204 |
| 5,794,039 A | * | 8/1998 | Guck ..................................... 1/1 |
| 5,835,084 A | | 11/1998 | Bailey et al. |
| 5,835,762 A | * | 11/1998 | Gans et al. ..................... 718/100 |
| 5,867,654 A | * | 2/1999 | Ludwig et al. ................ 709/204 |
| 5,915,004 A | * | 6/1999 | Pabbati et al. ............ 379/100.08 |
| 5,936,548 A | * | 8/1999 | Takatsuka ..................... 340/7.52 |
| 5,966,351 A | | 10/1999 | Carleton et al. |
| 6,037,935 A | | 3/2000 | Bates et al. |
| 6,065,012 A | * | 5/2000 | Balsara et al. ......................... 1/1 |
| 6,078,820 A | * | 6/2000 | Wells et al. .................... 455/466 |
| 6,092,101 A | * | 7/2000 | Birrell et al. .................. 709/206 |
| 6,125,281 A | * | 9/2000 | Wells et al. .................... 455/466 |
| 6,157,814 A | | 12/2000 | Hymel et al. |
| 6,192,396 B1 | * | 2/2001 | Kohler .......................... 709/206 |
| 6,212,547 B1 | * | 4/2001 | Ludwig et al. ................ 709/204 |

(Continued)

FOREIGN PATENT DOCUMENTS

CA          2 503 528          5/2004

(Continued)

OTHER PUBLICATIONS

Robert Cowart, Mastering Windows 95, 1995, Sybex, p. 571.*

(Continued)

*Primary Examiner* — Boris Pesin  
*Assistant Examiner* — John Heffington  
(74) *Attorney, Agent, or Firm* — Finnegan, Henderson, Farabow, Garrett & Dunner, LLP

(57) ABSTRACT

The presence of new unread electronic messages received, that is, messages received since unread messages were last reviewed, is provided by indicia presented to the user. These indicia can take various forms, such as by bolding, flashing, changing the size or color of a count of unread messages, and/or the unread message icon. Alternatively, a separate indication, such as a second count representing the number of new unread electronic messages received, or some other symbol, such as an explanation point, can be displayed.

19 Claims, 4 Drawing Sheets

U.S. PATENT DOCUMENTS

| | | | | |
|---|---|---|---|---|
| 6,216,127 | B1* | 4/2001 | Gans et al. | 1/1 |
| 6,337,699 | B1 | 1/2002 | Nielsen | |
| 6,396,509 | B1 | 5/2002 | Cheng | |
| 6,396,513 | B1 | 5/2002 | Helfman et al. | |
| 6,429,772 | B1* | 8/2002 | Lizzi | 340/7.55 |
| 6,466,654 | B1* | 10/2002 | Cooper et al. | 379/88.01 |
| 6,489,950 | B1 | 12/2002 | Griffin et al. | |
| 6,557,036 | B1* | 4/2003 | Kavacheri et al. | 709/224 |
| 6,628,194 | B1 | 9/2003 | Hellebust et al. | |
| 6,724,403 | B1* | 4/2004 | Santoro et al. | 715/765 |
| 6,731,308 | B1* | 5/2004 | Tang et al. | 715/751 |
| 6,741,268 | B1 | 5/2004 | Hayakawa | |
| 6,757,372 | B1* | 6/2004 | Dunlap et al. | 379/142.17 |
| 6,778,069 | B1* | 8/2004 | Katagiri | 340/7.55 |
| 6,792,085 | B1* | 9/2004 | Rigaldies et al. | 379/88.13 |
| 6,892,083 | B2* | 5/2005 | Shostak | 455/575.6 |
| 6,925,605 | B2* | 8/2005 | Bates et al. | 715/745 |
| 6,965,917 | B1 | 11/2005 | Aloni et al. | |
| 6,981,223 | B2* | 12/2005 | Becker et al. | 715/753 |
| 7,028,264 | B2* | 4/2006 | Santoro et al. | 715/765 |
| 7,047,030 | B2* | 5/2006 | Forsyth | 455/518 |
| 7,058,683 | B1* | 6/2006 | Belissent et al. | 709/206 |
| 7,061,470 | B1* | 6/2006 | Sharp | 345/160 |
| 7,076,057 | B1* | 7/2006 | Sharp | 379/433.06 |
| 7,085,812 | B1 | 8/2006 | Sherwood | |
| 7,120,474 | B1* | 10/2006 | Sharp | 455/575.1 |
| 7,151,923 | B2* | 12/2006 | Boland et al. | 455/412.2 |
| 7,181,701 | B2* | 2/2007 | Howard et al. | 715/854 |
| 7,185,054 | B1* | 2/2007 | Ludwig et al. | 709/204 |
| 7,212,814 | B2 | 5/2007 | Wilson et al. | |
| 7,213,206 | B2* | 5/2007 | Fogg | 715/706 |
| 7,213,210 | B2 | 5/2007 | Reysa | |
| 7,215,975 | B1* | 5/2007 | Sharp | 455/550.1 |
| 7,234,112 | B1 | 6/2007 | Brown et al. | |
| 7,248,881 | B2* | 7/2007 | Shostak | 455/456.1 |
| 7,254,410 | B2* | 8/2007 | Park | 455/466 |
| 7,257,415 | B2* | 8/2007 | Shostak | 455/456.1 |
| 7,281,201 | B2* | 10/2007 | Kumar et al. | 715/255 |
| 7,281,215 | B1* | 10/2007 | Canfield et al. | 715/752 |
| 7,310,541 | B2* | 12/2007 | Shostak | 455/575.6 |
| 7,313,389 | B1* | 12/2007 | Sharp et al. | 455/418 |
| 7,319,743 | B1* | 1/2008 | Dunlap | 379/93.01 |
| 7,376,907 | B2* | 5/2008 | Santoro et al. | 715/765 |
| 7,398,296 | B2* | 7/2008 | Ludwig et al. | 709/204 |
| 7,412,482 | B2* | 8/2008 | Ludwig et al. | 709/204 |
| 7,415,100 | B2* | 8/2008 | Cooper et al. | 379/88.01 |
| 7,421,470 | B2* | 9/2008 | Ludwig et al. | 709/204 |
| 7,433,921 | B2* | 10/2008 | Ludwig et al. | 709/204 |
| 7,437,179 | B1* | 10/2008 | Sharp | 455/550.1 |
| 7,437,411 | B2* | 10/2008 | Ludwig et al. | 709/204 |
| 7,437,412 | B2* | 10/2008 | Ludwig et al. | 709/204 |
| 7,439,872 | B2* | 10/2008 | Hiltunen | 340/691.1 |
| 7,441,001 | B2* | 10/2008 | Ludwig et al. | 709/204 |
| 7,444,373 | B2* | 10/2008 | Ludwig et al. | 709/204 |
| 7,454,716 | B2 | 11/2008 | Venolia | |
| 7,460,858 | B2* | 12/2008 | Boland et al. | 455/412.2 |
| 7,487,210 | B2* | 2/2009 | Ludwig et al. | 709/204 |
| 7,542,772 | B2* | 6/2009 | Jun | 455/466 |
| 7,605,801 | B1* | 10/2009 | Sharp | 345/161 |
| 7,634,528 | B2* | 12/2009 | Horvitz et al. | 709/200 |
| 7,669,140 | B2* | 2/2010 | Matthews et al. | 715/779 |
| 7,707,244 | B2* | 4/2010 | Malik et al. | 709/203 |
| 7,739,407 | B1* | 6/2010 | Pakkala | 709/246 |
| 7,908,320 | B2* | 3/2011 | Ludwig et al. | 709/204 |
| 7,920,678 | B2* | 4/2011 | Cooper et al. | 379/8 |
| 7,941,491 | B2 | 5/2011 | Sood | |
| 7,987,431 | B2* | 7/2011 | Santoro et al. | 715/765 |
| 8,000,453 | B2* | 8/2011 | Cooper et al. | 379/88.03 |
| 8,019,834 | B2* | 9/2011 | Horvitz et al. | 709/217 |
| 8,121,649 | B2* | 2/2012 | Shostak | 455/563 |
| 2002/0019852 | A1* | 2/2002 | Bahar | 709/206 |
| 2002/0076004 | A1 | 6/2002 | Brockenbrough et al. | |
| 2002/0130904 | A1* | 9/2002 | Becker et al. | 345/753 |
| 2002/0160817 | A1* | 10/2002 | Salmimaa et al. | 455/566 |
| 2002/0170040 | A1 | 11/2002 | Idan | |
| 2002/0191754 | A1* | 12/2002 | Liu et al. | 379/88.01 |
| 2002/0193128 | A1* | 12/2002 | Park | 455/466 |
| 2003/0014490 | A1* | 1/2003 | Bates et al. | 709/206 |
| 2003/0020671 | A1* | 1/2003 | Santoro et al. | 345/1.3 |
| 2003/0064707 | A1 | 4/2003 | Yongeyama | |
| 2003/0073434 | A1* | 4/2003 | Shostak | 455/426 |
| 2003/0120957 | A1* | 6/2003 | Pathiyal | 713/202 |
| 2004/0056893 | A1* | 3/2004 | Canfield et al. | 345/753 |
| 2004/0073605 | A1* | 4/2004 | Conley, Jr. | 709/203 |
| 2004/0127241 | A1* | 7/2004 | Shostak | 455/500 |
| 2004/0130580 | A1* | 7/2004 | Howard et al. | 345/854 |
| 2004/0137882 | A1* | 7/2004 | Forsyth | 455/414.1 |
| 2004/0155908 | A1* | 8/2004 | Wagner | 345/854 |
| 2004/0155909 | A1 | 8/2004 | Wagner | |
| 2004/0162773 | A1* | 8/2004 | Del Rey et al. | 705/36 |
| 2004/0176905 | A1* | 9/2004 | Sanqunetti et al. | 701/200 |
| 2004/0199663 | A1* | 10/2004 | Horvitz et al. | 709/238 |
| 2004/0259598 | A1* | 12/2004 | Wagner et al. | 455/566 |
| 2004/0266400 | A1* | 12/2004 | Boland et al. | 455/412.1 |
| 2004/0266403 | A1* | 12/2004 | Boland et al. | 455/412.2 |
| 2005/0053013 | A1* | 3/2005 | Traylor et al. | 370/254 |
| 2005/0076110 | A1* | 4/2005 | Mathew et al. | 709/223 |
| 2005/0080880 | A1* | 4/2005 | von Tetzchner et al. | 709/219 |
| 2005/0114458 | A1 | 5/2005 | Gottlieb | |
| 2005/0114753 | A1* | 5/2005 | Kumar et al. | 715/500.1 |
| 2005/0114781 | A1* | 5/2005 | Brownholtz et al. | 715/733 |
| 2005/0138552 | A1 | 6/2005 | Venolia | |
| 2005/0170863 | A1* | 8/2005 | Shostak | 455/556.1 |
| 2005/0193345 | A1* | 9/2005 | Klassen et al. | 715/751 |
| 2005/0240983 | A1 | 10/2005 | Peters | |
| 2005/0248437 | A1* | 11/2005 | Hellebust et al. | 340/7.51 |
| 2005/0283734 | A1* | 12/2005 | Santoro et al. | 715/765 |
| 2006/0020677 | A1 | 1/2006 | von Koch | |
| 2006/0084450 | A1* | 4/2006 | Dam Nielsen et al. | 455/466 |
| 2006/0106703 | A1* | 5/2006 | Del Rey et al. | 705/35 |
| 2006/0189337 | A1* | 8/2006 | Farrill et al. | 455/518 |
| 2006/0200455 | A1 | 9/2006 | Wilson | |
| 2007/0032269 | A1* | 2/2007 | Shostak | 455/563 |
| 2007/0107014 | A1* | 5/2007 | Howard et al. | 725/44 |
| 2007/0161400 | A1* | 7/2007 | Sharp et al. | 455/550.1 |
| 2008/0057977 | A1* | 3/2008 | Shostak | 455/456.1 |
| 2008/0140415 | A1* | 6/2008 | Shostak | 704/270.1 |
| 2008/0140416 | A1* | 6/2008 | Shostak | 704/270.1 |
| 2008/0201306 | A1* | 8/2008 | Cooper et al. | 707/3 |
| 2009/0018834 | A1* | 1/2009 | Cooper et al. | 704/257 |
| 2009/0018835 | A1* | 1/2009 | Cooper et al. | 704/257 |
| 2009/0018839 | A1* | 1/2009 | Cooper et al. | 704/260 |
| 2009/0132942 | A1* | 5/2009 | Santoro et al. | 715/765 |
| 2009/0299934 | A1* | 12/2009 | Horvitz et al. | 706/45 |
| 2010/0057875 | A1* | 3/2010 | Bychkov et al. | 709/206 |
| 2010/0287483 | A1* | 11/2010 | Smith et al. | 715/753 |

FOREIGN PATENT DOCUMENTS

| | | |
|---|---|---|
| EP | 0 961 447 | 5/1998 |
| JP | 2000295648 | 10/2000 |
| WO | WO 99/43171 A | 8/1999 |
| WO | WO 02/19082 | 3/2002 |
| WO | WO 2005/115035 | 12/2005 |

OTHER PUBLICATIONS

Microsoft Corporation, Microsoft Outlook 2000, 1999, Microsoft Corporation, Outlook main page.*

Cyrusoft International, Inc.: "Getting Started Guide—Mulberry IMAP Internet Mail Client Version 2.1"; Internet Document, 2001, pp. 1-36, XP002278985.

GMX: "GMX Handbuch", May 2003, Metys Verlag GmbH, Germany, XP002279699.

Gini Courter, et al., "Mastering Microsoft Office 2003 for Business Professionals," Published by John Wiley and Sons, Feb. 6, 2004, ISBN 0782142281, 695 pages; http://books.google.com/books?id=VHPfK9CH8-sC; 18 pp.

Office Action in copending U.S. Appl. No. 11/320,980, dated Feb. 3, 2011, 3 pp.

Office Action in copending U.S. Appl. No. 11/320,980 dated Oct. 4, 2010, 14 pp.

Office Action in copending U.S. Appl. No. 11/320,980 dated Dec. 28, 2009, 15 pp.

Office Action in Copending U.S. Appl. No. 11/320,980 dated Jun. 16, 2009, 14 pp.

Office Action in copending U.S. Appl. No. 11/320,980 dated Mar. 17, 2009, 3 pp.
Office Action in copending U.S. Appl. No. 11/320,980 dated Dec. 24, 2008, 15 pp.
Office Action in copending U.S. Appl. No. 11/320,980 dated Sep. 18, 2008, 3 pp.
Office Action in copending U.S. Appl. No. 11/320,980 dated Jul. 10, 2008, 14 pp.
Office Action in copending U.S. Appl. No. 11/320,980 dated Jan. 8, 2008, 13 pp.
Office Action in Canadian Patent Application 2,572,423 dated Mar. 9, 2010, counterpart of U.S. Appl. No. 11/320,980, 2 pp.
Office Action in Canadian Patent Application 2,572,423 dated Jun. 11, 2009, counterpart of U.S. Appl. No. 11/320,980, 3 pp.
Office Action dated Mar. 23, 2010 in corresponding Canadian Patent Application 2,498,082 (4 pages).
Office Action in Canadian Patent Application No. 2,498,082, counterpart of U.S. Appl. No. 10/785,340, dated Apr. 20, 2011, 4 pp.
Office Action in European Patent Application No. 05113104.3, counterpart of U.S. Appl. No. 11/320,980, dated Apr. 5, 2011, 7 pp.
Office Action in Canadian Patent Application No. 2,572,423, counterpart of U.S. Appl. No. 11/320,980, dated Aug. 5, 2011, 3 pp.
Office Action in copending U.S. Appl. No. 11/320,980 dated May 11, 2011, 15 pages.
Office Action in copending U.S. Appl. No. 12/423,427 dated Aug. 4, 2011, 19 pages.
Office Action in copending U.S. Appl. No. 12/423,427 dated Jan. 20, 2012, 18 pages.
Office Action issued by the Canadian Intellectual Property Office dated Apr. 23, 2012 for corresponding Canadian Patent Application No. 2,498,082, 4 pages.

* cited by examiner

METHOD AND SYSTEM FOR MANAGING UNREAD ELECTRONIC MESSAGES

BACKGROUND OF THE INVENTION

1. Field of the Invention

Aspects of this invention relate to the presentation of information providing assistance to a recipient in reviewing and processing electronic messages received. More particularly, they relate to a method and apparatus for managing unread electronic messages received.

2. Background Information

Electronic messaging has become a ubiquitous means of communication for both business and personal use. The volume of electronic messages received can be overwhelming. Devices that process electronic messages typically maintain a message list identifying electronic messages received for reading and processing by the recipient. Such processing can include replying to, deleting and filing the messages. It is common to provide a count of unread messages.

Recipients of electronic messages can be classified as either: (a) cleaners—those who file/delete electronic messages to maintain a clean message list that can then essentially be used as a task list; and (b) collectors—those who rarely file or delete electronic messages and leave numerous messages unread on an ongoing basis. Anecdotally, there is roughly a 50/50 split between cleaners and collectors within the user base of handheld electronic devices.

SUMMARY OF THE INVENTION

In accordance with an aspect of the invention, an indication is provided of the presence of new unread electronic messages received since the message list was last viewed (and potentially an e-mail message opened/viewed). This indication can merely signal that there are new unread messages or it can be quantitative and indicate the number of new unread messages received.

More particularly, one aspect of the invention is directed to a method of managing unread electronic messages received that comprises the steps of: providing an indication of the presence of unread electronic messages received; enabling scanning of the unread electronic messages received without reading; and generating an indication that new electronic messages have been received since the unread electronic messages received were last scanned. The presence of unread electronic messages can be provided through a visual display with the indication of new electronic messages received generated by altering the visual display. The visual display can be altered in various ways to indicate the presence of new unread electronic messages received. For instance, where the visual display provides a visual indication of the count of unread electronic messages received, the display can be altered by, for example, bolding, flashing, changing the size or changing the color of the count. Where an icon representing the presence of unread electronic messages is used in addition to the count of unread messages, the display can be altered by altering at least one of the icon and the count. Furthermore, the display can be altered to indicate the presence of new unread electronic messages received by adding an indicia, which can be a second count representing the number of new unread electronic messages received.

Another aspect of the invention is directed to a system for managing electronic messages received comprising: a display, a message list of electronic messages received with identification of those that are unread; an input means for selectively displaying the message list on the display for scanning for unread messages received; and indicator means on the display indicating the presence of new unread electronic messages received since the message list was last displayed. The indicating means can include means providing on the display a count of the unread electronic messages received in addition to the indication of the presence of new unread electronic messages received. The indicating means providing an indication of new unread electronic messages received can be an alteration to the count of the unread electronic messages received such as by at least one of bolding the count, flashing the count, changing the size of the count and changing the color of the count. Alternatively, the indicator means providing the indication of the presence of a new unread electronic message received can provide additional indicia on the display such as a second count that is a count of the new unread electronic messages received, or another symbol. Also, alternatively the indicator means can further comprise a message icon on the display adjacent the count of unread electronic messages received and the indication of the presence of new unread electronic messages received can be an alteration to the message icon, such as for example, by bolding, flashing, changing the size and/or changing the color of the icon.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
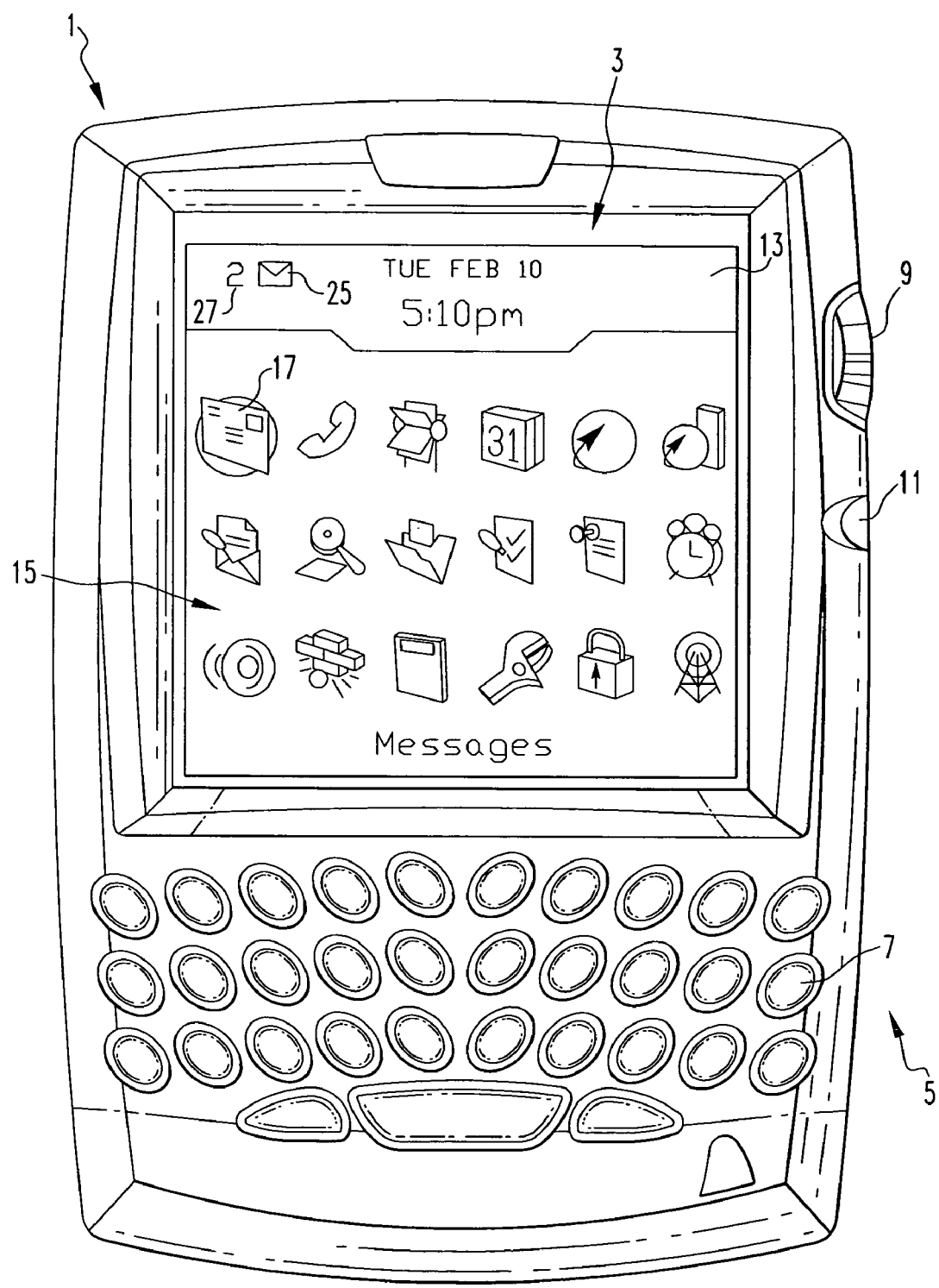
FIG. 1 is a front view of a handheld electronic device incorporating the invention and displaying the home screen indicating the presence of unread electronic messages received, but no new unread electronic messages received.

Aspects of the invention will be described as applied to a handheld electronic device. However, they are applicable to other devices that receive electronic messages such as workstations, desktop computers, laptop computers, cell phones and the like. In the exemplary embodiments of the invention, the electronic messages are text messages that are delivered over the Internet, an intranet or other communications channels, and can include wireless transmissions. Referring to FIG. 1, the handheld electronic device 1 has a display 3 and an input device 5 that includes a keyboard 7, a trackwheel 9 and an escape button 11. The display 3 can present a number of screens with FIG. 1 illustrating the home screen 13. The home screen 13 displays a number of icons 15 which can be highlighted by the trackwheel 9 to select one of a number of functions that can be performed by the device, as is known. An icon 17 can be selected to bring up on the display a message list 19 illustrated in FIG. 2, which presents summary information on all of the electronic messages received that have not yet been processed. This includes messages that have been read and those that are unread. Messages are read by scrolling through the message list with the trackwheel 9 and then pressing inward on the trackwheel to open the selected message. Messages that have been read are identified by the open envelope icon 21 at the left side of the message list 19. Those that are unread are identified by the closed envelope icon 23.

Figure 2:
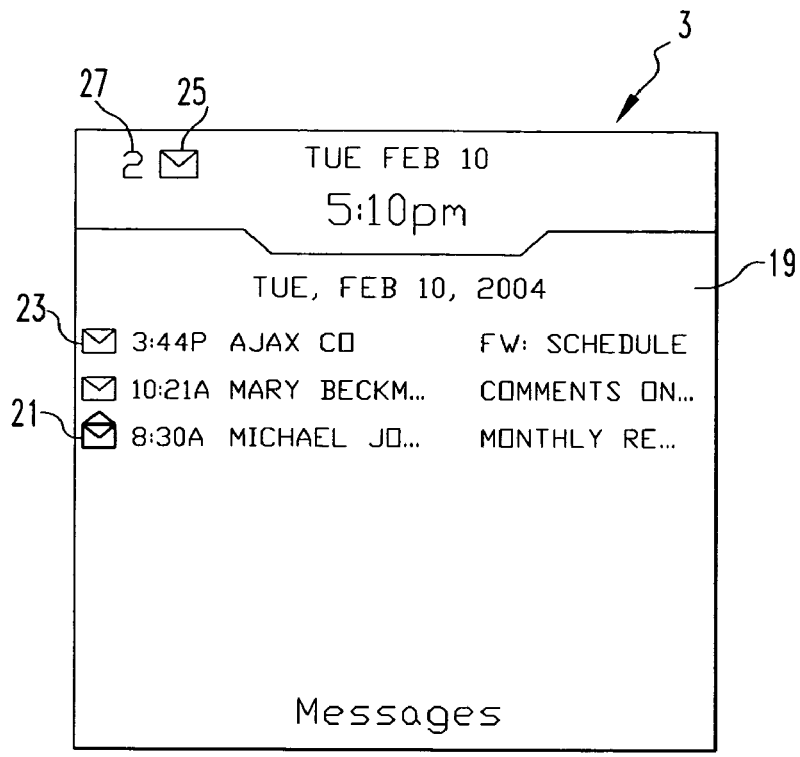
FIG. 2 is a message list displayed on the handheld electronic device of FIG. 1.

When there are unread electronic messages, a mail icon 25 is displayed in the top left corner of the message list screen 19 with an indicia of the number of unread electronic messages received in the form of a count 27 of unread messages presented to the left of the mail icon 25, as is common practice. In the example of FIG. 2, there are two unread electronic messages. Returning to FIG. 1, the mail icon 25 and unread message count 27 are also displayed in the upper left corner of the home screen 13 when there are unread electronic messages present.

Figure 3:
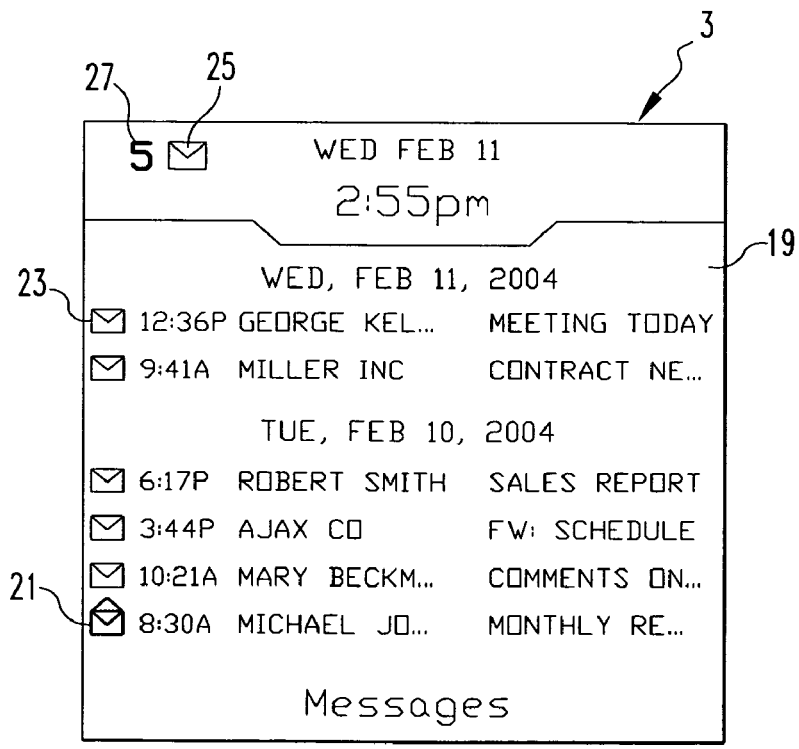
FIG. 3 is a message list similar to FIG. 2 illustrating the display of an indication of the presence of new unread electronic messages received in accordance with one embodiment of the invention.

As was mentioned, there are a significant number of recipients of electronic messages who do not regularly clean out their messages received because of the sheer volume of messages and/or the lack of time or inclination. Aspects of the invention help these people to manage their electronic messages received by providing an indication that new electronic messages have been received since the user last scanned the message list. FIG. 3 extends the example of FIG. 2 by illustrating the message list 19 at a later time when three new unread messages have been received since the list was last scanned to join the two old messages that remain unread. In accordance with this aspect of the invention, an indication of the presence of unread electronic messages received is provided. This is implemented, for example, by the mail icon 25 accompanied by the unread message count 27 presented on the home screen 13, as is common. Scanning of the unread electronic messages received without reading of the messages is enabled by calling up the message list 19 through selection of the read mail icon 17 from the home screen 13 shown in FIG. 1. An indication that new unread electronic messages have been received since the message list was last scanned is also provided. This indication can take many forms. In a first embodiment of the invention illustrated in FIG. 3, the unread message count 27 is bolded to provide this indication. The same bolding of the unread message count 27 is effected on the home screen 13 (not shown). The user may then call up from the home screen and scan the message list 19. As the messages are arranged in the order received, the user need only scan from the top of the message list to observe the new unread electronic messages received.

Figure 4:
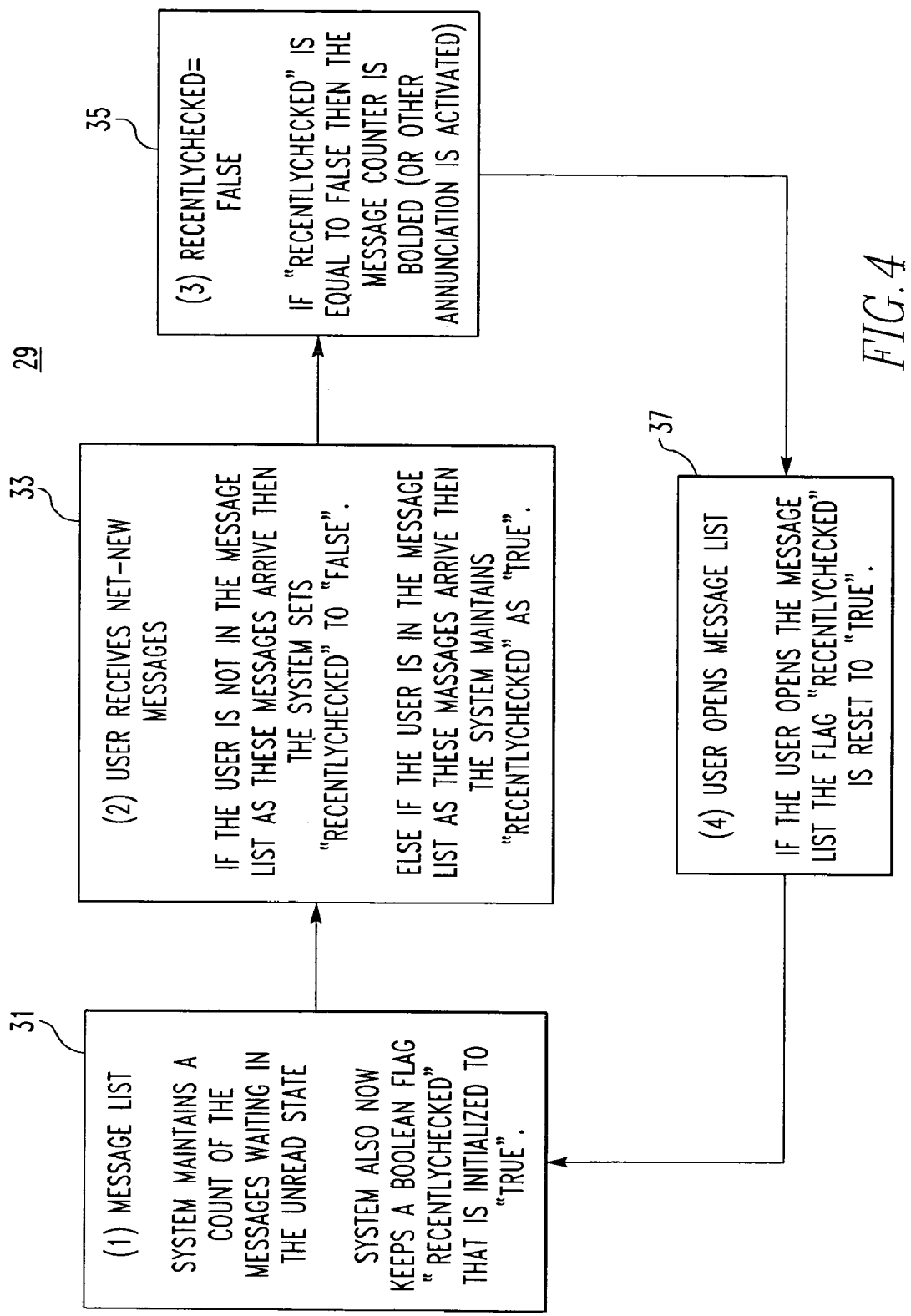
FIG. 4 is a flow chart illustrating implementation of the embodiment of FIG. 3.

FIG. 4 is a flow chart 29 illustrating the process. As indicated at 31, the system maintains a count of messages waiting in the unread state. The system also keeps a "recently checked" flag that is initialized to "true." When the user receives net-new messages at 33 and the device is not displaying the message list as these messages arrive, the "recently checked" flag is set to "false." If the user is viewing the message list as these new messages arrive, the system maintains the "recently checked" flag in the "true" state. When the "recently checked" flag is set to "false," the unread message count icon 27 is bolded at 35. Alternatively, as discussed below, other annunciations can be activated to provide the indication of the presence of new unread electronic messages received. When the user opens the message list 19 as indicated at 37, the "recently checked" flag is reset to "true" until additional new unread electronic messages are received. Alternatively, or in addition to bolding the unread message count 27, the mail icon 25 can be bolded.

Figure 5:
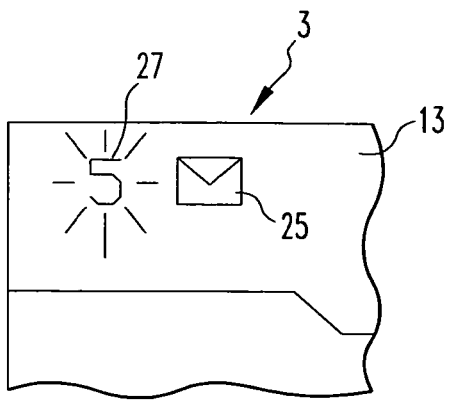
FIG. 5 is similar to FIG. 3 but illustrating a display of an indication of the presence of new unread electronic messages received in accordance with a second embodiment of the invention.

FIG. 5 illustrates a second embodiment of the invention in which the unread message count 27 is flashed to provide the indication of new unread electronic messages received. As in the case of bolding, alternatively or additionally, the mail icon 25 can be flashed.

Figure 6:
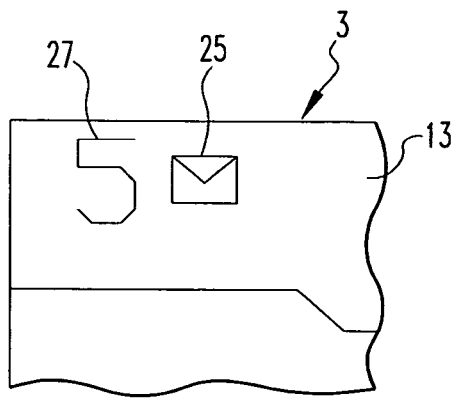
FIG. 6 is similar to FIG. 3 but illustrating a display of an indication of the presence of new unread electronic messages received in accordance with a third embodiment of the invention.

A third embodiment of the invention is illustrated in FIG. 6 where the size of the unread message count (and/or the size of the mail icon 25) can be increased to provide the indication of new unread messages received.

Figure 7:
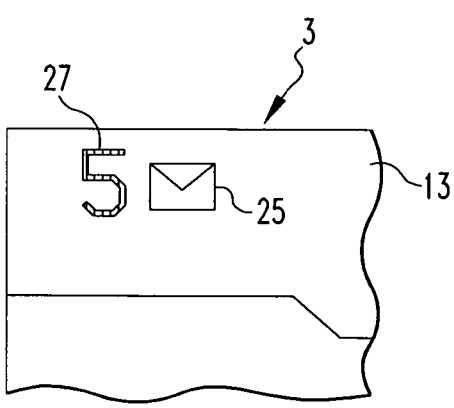
FIG. 7 is similar to FIG. 3 but illustrating a display of an indication of the presence of new unread electronic messages received in accordance with a fourth embodiment of the invention.

FIG. 7 illustrates a fourth embodiment of the invention in which the color of the unread message count 27 (and/or the mail icon 25) is changed to provide the indication of new unread electronic messages received. Where the device has a black and white display, the color change can be implemented by a negative image of the count (e.g., white on black instead of black on white).

Figure 8:
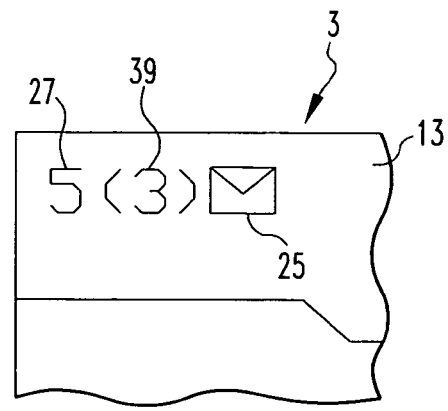
FIG. 8 is similar to FIG. 3 but illustrating a display of an indication of the presence of new unread electronic messages received in accordance with a fifth embodiment of the invention.
Figure 9:
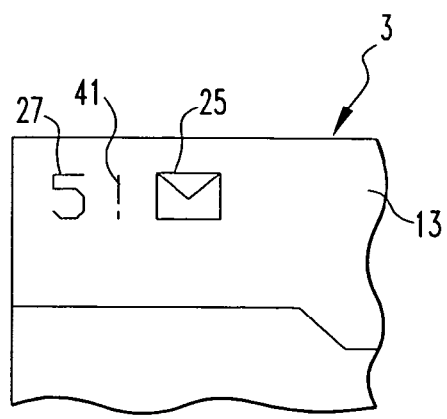
FIG. 9 is similar to FIG. 3 but illustrating a display of an indication of the presence of new unread electronic messages received in accordance with a sixth embodiment of the invention.

A fifth embodiment of the invention is illustrated in FIG. 8 where a second count 39, which is a count of the new unread messages received, is displayed on the home screen 13 in addition to the unread message count 27. This second count 39 can be distinguished, such as by placing it in parenthesis as shown in FIG. 8, making it a different color from the count 27, or by otherwise differentiating the two counts.

In yet another, sixth, embodiment of the invention, an additional indicia 41 is provided to indicate the presence of new unread electronic messages. In the example an explanation point is used. Clearly, other symbols could be used. In fact, it will be apparent at this point that other indicia, within the imagination of those skilled in the art, could be provided to indicate the presence of new unread electronic messages.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of managing unopened electronic messages comprising the steps of:
   displaying a home screen on a visual display;
   providing, at a location on the home screen, a first indicator of the presence of a number of unopened electronic messages received, and an associated value reflecting the number of unopened electronic messages received;
   selectively displaying on the visual display a message listing to view portions of electronic messages, the electronic messages including at least one electronic message in an unopened state;

redisplaying the home screen with the first indicator on the visual display, following display of the message listing, and while the at least one electronic message is in the unopened state; and altering the first indicator to provide a visually distinguishable non-numerical annunciation that a new unopened electronic message is received, the visually distinguishable non-numerical annunciation distinguishing the new unopened electronic message from the at least one electronic message in the unopened state.

2. A method of managing unopened electronic messages comprising the steps of:

displaying a home screen on a visual display;

providing, at a location on the home screen, a first indicator of the presence of a number of unopened electronic messages received, and an associated value reflecting the number of unopened electronic messages received;

selectively displaying on the visual display a message listing to view portions of electronic messages, the electronic messages including at least one electronic message in an unopened state;

redisplaying the home screen with the first indicator on the visual display, following display of the message listing, and while the at least one electronic message is in the unopened state; and generating a second indicator at, or proximate to, the location on the home screen, to provide a visually distinguishable non-numerical annunciation by altering the first indicator with the non-numerical annunciation to reflect that a new electronic message is received, the visually distinguishable non-numerical annunciation distinguishing the new electronic message from the at least one electronic message in the unopened state.

3. The method of claim 2, further comprising:

displaying an icon with the first and second indicators; and altering the icon by flashing, bolding, changing the size, and changing the color of the icon.

4. The method of claim 2, further comprising:

adding indicia to the first indicator.

5. The method of claim 2, wherein the step of altering the first indicator comprises altering at least one of an unopened mail icon and a count of unopened electronic messages.

6. A system for managing electronic messages received, comprising:

a visual display;

a home screen displaying one or more icons corresponding to functions that can be performed by the system;

a message listing providing portions of received electronic messages including at least one electronic message in an unopened state;

input means for selectively displaying the message listing on the visual display, and redisplaying the home screen on the visual display while the at least one electronic message is in the unopened state;

a first indicator at a location on the home screen for indicating the presence of a number of electronic messages in an unopened state from among the received electronic messages and an associated value reflecting the number of electronic messages in an unopened state; and a second indicator at, or proximate, to the location on the home screen that alters the first indicator to provide a visually distinguishable non-numerical annunciation reflecting that new unopened electronic messages have been received, the visually distinguishable non-numerical annunciation distinguishing the new unopened electronic messages from the at least one electronic message in the unopened state.

7. The system of claim 6, wherein the visually distinguishable annunciation comprises an alteration to the count of unopened electronic messages received.

8. The system of claim 7, wherein the alteration to the count comprises at least one of:

bolding the count, flashing the count, changing the size of the count, and changing the color of the count.

9. The system of claim 6, wherein the second indicator comprises additional indicia on the display.

10. The system of claim 6, wherein the second indicator comprises a message icon on the display adjacent the count of unopened electronic messages received, and the annunciation of the presence of a new unopened electronic message received since the message list was last displayed comprises altering the message icon.

11. The system of claim 10, wherein altering the message icon comprises at least one of:

bolding the icon, flashing the icon, changing the size of the icon, and changing the color of the icon.

12. A method of managing unopened electronic messages comprising the steps of:

displaying a home screen on a visual display;

providing, at a location on the home screen, a first indicator of the presence of a number of unopened electronic messages, and a first associated value reflecting the number of unopened electronic messages;

selectively displaying on the visual display a message listing to view portions of unopened electronic messages;

redisplaying the home screen with the first indicator on the visual display, following display of the message listing, and while at least one electronic message is still in an unopened state; and providing a second indicator at the location on the home screen, reflecting that a number of new unopened electronic messages have been received, the second indicator distinguishing the new unopened electronic messages from the at least one electronic message in the unopened state represented by the first indicator.

13. A method of managing unopened electronic messages comprising the steps of:

displaying a home screen on a visual display;

providing, at a location on the home screen, a first indicator of the presence of a number of unopened electronic messages received, and an associated value reflecting the number of unopened electronic messages received;

selectively displaying on the visual display a message listing to view portions of the unopened electronic messages received;

redisplaying the home screen with the first indicator on the visual display, following display of the message listing, and while at least one electronic message is in an unopened state; and altering the first indicator to provide a visually distinguishable non-numerical annunciation that a new unopened electronic message is received, the visually distinguishable non-numerical annunciation distinguishing the new unopened electronic message from the at least one electronic message in the unopened state; and updating the associated value to provide a single value simultaneously reflecting the new unopened electronic message and the at least one electronic message in the unopened state.

14. The method of claim 1, further comprising the steps of:

determining a Boolean value associated with the visually distinguishable non-numerical annunciation; and triggering the Boolean value, upon receipt of the new unopened electronic message following redisplaying of the home screen, to control displaying of the visually distinguishable non-numerical annunciation.

15. The method of claim 1, further comprising:
maintaining the alteration of the first indicator until selectively redisplaying on the visual display the message listing while the new unopened electronic message is in an unopened state.

16. The method of claim 2, further comprising:
removing the second indicator upon selectively redisplaying on the visual display the message listing while the new unopened electronic message is in an unopened state.

17. The system of claim 6, wherein the second indicator is removed upon selectively redisplaying on the visual display the message listing while the new unopened electronic message is in an unopened state.

18. The method of claim 12, further comprising:
removing the second indicator upon selectively redisplaying on the visual display the message listing while a new unopened electronic message is in an unopened state.

19. The method of claim 13, further comprising:
maintaining the alteration of the first indicator until selectively redisplaying on the visual display the message listing while the new unopened electronic message is in an unopened state.

\* \* \* \* \*